US012006961B2

(12) United States Patent
Becker et al.

(10) Patent No.: US 12,006,961 B2
(45) Date of Patent: Jun. 11, 2024

(54) MODULAR SCREW AND METHOD OF MANUFACTURING A MODULAR SCREW

(71) Applicant: ILLINOIS TOOL WORKS INC., Glenview, IL (US)

(72) Inventors: Sven Becker, Bochum (DE); Bruno Da Rocha, Altena (DE); Andreas Jakob, Hemer (DE); Stefan Helbert, Witten (DE); Nelson Santos, Iserlohn (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 215 days.

(21) Appl. No.: 17/590,399

(22) Filed: Feb. 1, 2022

(65) Prior Publication Data

US 2022/0260105 A1    Aug. 18, 2022

(30) Foreign Application Priority Data

Feb. 12, 2021   (DE) ...................... 10 2021 103 410.8

(51) Int. Cl.
*F16B 43/00* (2006.01)
*F16B 33/02* (2006.01)

(52) U.S. Cl.
CPC .............. *F16B 33/02* (2013.01); *F16B 43/00* (2013.01)

(58) Field of Classification Search
CPC .......... F16B 31/02; F16B 43/00; F16B 35/04; F16B 35/041; B23G 11/00; B23G 7/02; B23G 9/00
USPC ..................................... 411/371.2; 470/8, 11
See application file for complete search history.

(56) References Cited

U.S. PATENT DOCUMENTS

| 1,868,415 | A | * | 7/1932 | Gundersen | B23G 9/001 |
| | | | | | 29/520 |
| 2,303,224 | A | * | 11/1942 | Olson | B23P 19/08 |
| | | | | | 470/42 |
| 3,152,507 | A | * | 10/1964 | Wieber | F16B 39/20 |
| | | | | | 411/405 |
| 3,181,584 | A | * | 5/1965 | Borowsky | F16B 39/26 |
| | | | | | 29/520 |
| 3,828,382 | A | * | 8/1974 | Nakamura | B21K 1/46 |
| | | | | | 470/5 |
| 3,862,458 | A | * | 1/1975 | Stanaitis | H01R 4/301 |
| | | | | | 470/4 |
| 4,123,132 | A | * | 10/1978 | Hardy | F16B 39/24 |
| | | | | | 439/709 |
| 4,321,001 | A | * | 3/1982 | Gruich | F16B 35/00 |
| | | | | | 470/48 |

(Continued)

FOREIGN PATENT DOCUMENTS

| CN | 204729438 U | 10/2015 |
| DE | 19916989 A1 | 10/2000 |
| EP | 2638299 B1 | 3/2016 |

*Primary Examiner* — Gary W Estremsky
(74) *Attorney, Agent, or Firm* — THOMPSON HINE LLP (57) ABSTRACT

A modular screw is provided, wherein the screw includes, in an axial direction, the following elements: a screw head, a shank having a second functional portion, a third functional portion for distributing a prestressing force, wherein a washer is arranged in the second functional portion and is mounted so as to be rotatable about a longitudinal axis of the screw, and a fourth functional portion having an external thread, and wherein the washer is secured in an approximately positionally fixed manner in the axial direction by bearing against the second and the fourth functional portion.

10 Claims, 4 Drawing Sheets

(56) References Cited

U.S. PATENT DOCUMENTS

| | | | |
|---|---|---|---|
| 4,941,787 A | 7/1990 | Shaffer | |
| 5,649,798 A * | 7/1997 | Ito | F16B 43/00 |
| | | | 411/533 |
| 8,920,092 B2 * | 12/2014 | D'Addario | G10G 5/005 |
| | | | 84/327 |
| 2007/0274805 A1 * | 11/2007 | Nebl | F16B 5/0266 |
| | | | 411/371.1 |
| 2009/0232618 A1 * | 9/2009 | Ballenger | F16B 43/00 |
| | | | 411/371.2 |
| 2020/0291974 A1 * | 9/2020 | Sifferman | F16B 19/02 |

* cited by examiner

ND METHOD OF
MODULAR SCREW AND METHOD OF MANUFACTURING A MODULAR SCREW

TECHNICAL FIELD

The present invention relates to a modular screw as well as a method for producing a modular screw.

BACKGROUND

A screw is a cylindrical or slightly tapered (conical) body in whose surface a thread (a helical circumferential groove) is cut or rolled. In the case of shank screws (screws with partial threads), only a part of the shank bears a thread. Thread rolling is a variant of rolling and is used in order to produce threads. The shaping is based on the generation of compressive stresses by means of tools formed on the part.

A screw head is usually attached to one end of a screw, on which screw head a so-called drive is formed. The drive has a special contour, via which the form-fitting engagement to the appropriate tool is produced, usually a screwdriver or a wrench, with which the screw can be screwed in and out. A lower ring surface ("chin") of the screw head is used in order to transfer power to a component to be fastened.

Clamping disks are spring elements, e.g., in the form of a disk spring, whose securing effect is based solely on traction. They are intended to counteract a loosening of a screw connection, for example due to embedding loads, by maintaining a sufficiently high prestressing in the connection by means of spring forces.

Washers or shims are annular disks that can be folded over a shank of a screw and are usually made of metal. "Enclosed" between the screw head and the part to be fastened with the screw, the washer serves to transfer the force exerted from the bottom of the screw head to a larger surface area of the part in question, whose material is usually less solid than that of the screw.

Due to its larger diameter, the washer remains on the part to be fastened while the screw or nut is tightened. Slippage occurs between it and the screw head or nut, and the surface of the part cannot be injured by rubbing.

Compression limiters are metal inserts that are usually provided for use in plastic moldings. The compression limiter resists a compressive force created during assembly of a counterscrew or bolt. By using a compression limiter, damage to components to be fastened is prevented. In addition, creep is prevented, and a compressive force is maintained in the connection.

SUMMARY

The problem addressed by the present invention is to provide a modular screw that is easily and flexibly adaptable to different mechanical requirements and uses.

A further problem addressed by the present invention is to provide a modular screw that performs two or more technical functions.

In particular, a problem addressed by the present invention is to provide a modular screw that allows for a higher prestressing force at a predetermined torque.

In addition, it is a problem of the present invention to form an alternative modular screw having a clamping disk, a compression-limiting portion, and/or a washer.

Furthermore, a problem addressed by the present invention is to provide a modular screw that is simple and inexpensive to produce.

A further problem addressed is to provide a corresponding method for cost-effective and easy production of a modular screw.

One or more of these problems are solved by the features of the claims.

According to the invention, a modular screw is provided, wherein the screw comprises, in an axial direction, the following elements: a screw head, a shank having a second functional portion, a third functional portion for distributing a prestressing force, wherein a washer is arranged in the second functional portion and is mounted so as to be rotatable about a longitudinal axis of the screw, and a fourth functional portion having an external thread, and wherein the washer is secured in an approximately positionally fixed manner in the axial direction by bearing against the second and the fourth functional portion.

Such a screw then has three portions: the second, third, and fourth functional portion.

Because the modular screw has a third functional portion for distributing a prestressing force, wherein a washer is arranged in the third functional portion and is mounted so as to be rotatable about a longitudinal axis of the screw, and wherein the washer is secured in an approximately positionally fixed manner in the axial direction by bearing against the second and the fourth functional portion, a modular screw is formed where the washer contacts a component surface and rotates only slightly or not at all during tightening. The third functional portion thus forms a force-distributing portion.

In this way, an improved fastening operation is provided, because there is little to no frictional force between the rotatably mounted washer and a corresponding component surface. In this way, a higher prestressing force can be applied by means of the screw, wherein an identical or lower torque compared to known screw connections is simultaneously necessary. According to a first aspect of the present invention, a modular screw having a washer is provided.

For this purpose, screws known from the prior art generally have an enlarged radius or a radially circumferential collar instead of the washer in order to form a corresponding shoulder for bearing on a component surface.

Furthermore, by means of the modular screw according to the invention, washers of different diameters can be used. In this way, a bearing surface can be enlarged, and the screw is easily adaptable to different mechanical requirements.

The bearing of the washer in the axial direction on the second and the fourth functional portions is carried out by corresponding bearing portions of the second and the fourth functional portions, which have a larger diameter than a through-opening of the washer, so that the washer is secured in an approximately positionally fixed manner against a displacement in the axial direction as well as against a rotational movement about the longitudinal axis of the screw.

In this way, an anti-loss mechanism for the washer is formed, because it is then held in a loss-proof manner by the bearing portions of the second and the fourth functional portions.

In addition, the washer allows for a pre-assembly in a through-opening of a component to be mounted. Accordingly, an arrangement comprising the modular screw and a component to be fastened can also be provided according to the invention. The component then has a through-opening, wherein for example three latching means or edges, which are radially circumferential and arranged equally spaced apart from one another, are provided in the through-opening and extend radially inwardly and engage the washer from behind. The modular screw is thus then pre-assembled and/or arranged in the component in a loss-proof manner.

In a first functional portion between the screw head and the second functional portion, a clamping disk can be arranged, wherein the clamping disk preferably takes the form of a disk spring and is connected and secured to the shank in a positionally fixed manner. According to a second aspect of the present invention, a modular screw having a washer and a clamping disk is provided.

Such a screw then has four portions: the first, the second, the third, and the fourth functional portions.

Because the screw has a clamping disk whose securing effect is based solely on traction, the first functional portion counteracts a loosening of a screw connection, for example due to embedding loads, in that the clamping disk maintains a sufficiently high prestressing in the connection by means of spring forces. The first functional portion is therefore referred to as the prestressing portion.

The clamping disk is preferably freely rotatable about the longitudinal axis. A movement of the clamping disk in and counter to the axial direction is limited by the screw head and the washer. The clamping disk is thus connected to the screw shank in a loss-proof manner, and the washer forms a sealing mechanism for the clamping disk in conjunction with the screw head.

In addition, by means of the modular screw according to the invention, clamping disks having different spring characteristics can be used. In this way, the screw is easily adaptable to different mechanical requirements.

With the fastening means known from the prior art, only an insufficient prestressing force can usually be applied.

By contrast, with the modular screw according to the invention, the fourth functional portion having the external thread can be dimensioned to be sufficiently strong in order to provide a desired prestressing force, whereas the clamping disk can take any desired form, for example when using a low material thickness, in order to form a soft spring characteristic. The fourth functional portion thus forms a threaded portion.

In this way, predetermined prestressing force requirements can be met. At the same time, with the modular screw according to the invention, a lower or identical tightening torque is necessary, as is the case with fasteners known from the prior art.

The second functional portion can be a compression-limiting portion whose diameter is preferably larger than a diameter of the external thread.

Because the second functional portion is formed as a compression-limiting portion, creep is prevented, and a compressive force in a connection is constantly maintained. In addition, damage to the component to be fastened is safely and reliably prevented.

In the prior art, tension springs are formed together with a sleeve as a single component, e.g., by means of deep drawing. The sleeve and the tension spring therefore have the same material thickness. The sleeve can be embodied as a compression-limiting means.

However, a stable sleeve and a tension spring having a low or reduced prestressing force, for example for the assembly of plastic and/or composite components (e.g., engine cover), is often desired so as not to damage them.

In the present invention, the compression-limiting portion is embodied independently from the clamping disk. Thus, for example, thin-walled tension springs having a soft spring characteristic can be used for the fastening of plastic and/or composite components. In this way, the modular screw is easily adaptable to specific requirements.

By providing one or more of the technical features of the present invention described above, a modular screw is provided, preferably having three parts: namely, the screw itself, the clamping disk, and the washer. By allowing the modular screw to be formed from these three components, clamping disks having different spring characteristics can be used.

Although the modular screw is fully pre-assembled with the clamping disk and washer, the washer is still freely rotatable, so that there are fewer frictional forces when tightening the screw, because the washer does not rotate while the screw is being fastened, and therefore no or only minor frictional forces occur between a component surface and the clamping disk.

The screw head can comprise a corresponding drive, wherein the type of drive (e.g., slotted, Phillips, Allen key, Torx, hexagon head drive) can be adjusted as desired in order to meet the desired requirements. The same applies to a corresponding screw length, a clamping length, a diameter of the washer, a spring characteristic, and/or a diameter of the clamping disk, as well as a dimensioning of the compression-limiting portion.

The washer can have a larger diameter than the second functional portion.

A length of the compression-limiting portion and the third functional portion can, in the axial direction, be less than a height of a through-opening of a component in the axial direction in which the screw is arrangeable. In this way, a predetermined surface compression of a component to be fastened is not exceeded. In particular, damage to plastic and/or composite components is thereby avoided due to a corresponding torque.

According to a further aspect of the present invention, a modular screw according to the invention can be produced by
  pressing the screw head and the shank in a pressing machine,
  applying the washer and/or clamping disk to the shank, preferably in a rolling machine, and
  rolling the external thread in the rolling machine.

If necessary, a further step of heat-treating and/or coating of the modular screw can occur.

A screw is usually produced by pressing and rolling. It is then hardened and coated, if necessary. Parallel to this, a corresponding disk is produced, which is then also hardened and coated. The screw and washer are then connected to one another in one step, or the washer is mounted onto the screw.

In the present invention, on the other hand, a blank of the screw comprising the screw head and the shank is first produced by means of pressing in the pressing machine. Subsequently, unhardened and uncoated disks and blanks are fed to the rolling machine. The feeding can be carried out via corresponding feeding devices, e.g., a distributor pot or a feeding bar or the like.

In the rolling machine, the clamping disk and/or washer are then applied to the shank in a region prior to corresponding roller jaws for thread rolling. Thereafter, the external thread is rolled or produced by means of the roller jaws in the rolling machine.

The screw and washer(s) can then be jointly hardened and coated in order to form the modular screw.

Accordingly, a corresponding device for producing a modular screw comprising the pressing and rolling machine shown above can also be provided according to the present invention.

With respect to known methods and devices in this regard, one or more process steps are then eliminated, such as a separate assembly of a washer on the screw and/or a hardening and/or separate coating of the washer.

Thus, according to the invention, a more economical production is also provided, characterized by the fact that individual process steps such as hardening and coating are now possible together.

Such fasteners known from the prior art typically utilize deep-drawn and die-cut clamping disks that require expensive tools and cause high production costs. Clamping disks and/or washers are produced and treated separately and connected to or applied to a screw in a separate production step.

Because, in the present invention, the clamping disk and/or the washer are fed in a rolling machine immediately prior to thread rolling, the modular screw according to the present invention can be produced by comparatively simple production methods, such as rolling, cutting, and bending of the metal parts, for which simpler tools can be used and lower production costs are incurred.

Further, with the fastening means known from the prior art, a costly assembly process is required for screws having clamping disks, for which complex machines are necessary. The modular screw according to the invention, on the other hand, greatly simplifies the assembly process, because the clamping disk and/or the washer are produced in an intermediate step in the rolling process of the screw and the thread, which is necessary anyway. This means that the starting material for the disks is fed to the rolling machine and assembled during the rolling process.

In addition, with such fastening means from the prior art, it is provided that the individual components (screw, clamping disk, and/or washer) are heat-treated and coated separately; in particular, the heat treatment and coating of the screw shanks and the washers take place independently of one another. In most cases, a further coating process is then carried out after the screw has been mounted. By contrast, in the present modular screw according to the invention, a common coating process and a common heat treatment are provided for forming the modular screw.

This means that the individual components (screw, clamping disk, and/or washer) of the modular screw are coated simultaneously, but the coating process and/or the heat treatment can also comprise two or more steps depending on the requirements, e.g., if the components are to be galvanized and additionally receive a KTL top layer (black coloring). However, according to the present invention, these steps can always be carried out in a single work step simultaneously for all components of the modular screw.

The screw, washer, and/or clamping disk can be formed from plastic as well as from a metallic material or combinations thereof. The design, shape, and geometry as well as the material properties are thus adaptable as needed to the desired requirements. Preferably, it is provided that the clamping disk and/or the washer are formed from a metallic material.

According to a further aspect of the present invention, a modular screw can be provided, wherein the screw comprises, in an axial direction, the following elements: a screw head, a shank having a first functional portion for distributing a prestressing force, wherein a clamping disk is arranged adjacent to the screw head in the first functional portion, wherein the clamping disk preferably takes the form of a disk spring and is connected and secured to the shank in a positionally fixed manner, a second functional portion, and a fourth functional portion having an external thread.

Such a screw then has three portions, the first, the second, and the fourth functional portions.

According to this aspect, the clamping disk can be connected to the screw shank according to the above embodiments.

According to this aspect of the present invention, in particular, the clamping disk has a connecting means via which the clamping disk is connected to the shank in a positionally fixed manner by means of frictional and/or form-fitting engagement, wherein the connecting means is designed to provide a frictional connection.

Because the clamping disk has a connecting means via which the clamping disk is connected to the shank in a positionally fixed manner by means of frictional and/or form-fitting engagement, wherein the connecting means is designed to provide a frictional connection, a modular screw having clamping disks with different spring characteristics can easily be provided and can be adapted as desired to corresponding mechanical requirements. Such a modular screw can be produced at a much lower cost than fasteners known from the prior art.

The clamping disk can have a through-opening, wherein the connecting means takes the form of tabs having retaining edges, said tabs being directed from an edge of the through-opening in the radial direction inwardly in the direction of the longitudinal axis.

Preferably, three, four, five, or more radially circumferential and equally spaced tabs can be provided.

A clamping disk having a corresponding connecting means offers the advantage that the geometry, material thickness, material quality, and/or heat treatment can be adjusted as desired to the mechanical requirements of the clamping disk.

Deep-drawn metal stamped parts known from the prior art require expensive tools and high production costs. With the modular screw according to the invention, only simple cutting and bending operations of the metal parts are necessary, which require simpler tools and cause lower production costs.

With respect to the high production costs with fasteners known from the prior art, especially in the case of screws having clamping disks, the assembly of the screw and the clamping disk is an important factor, because this requires complex and expensive machines or tools. Because connection means are provided in the modular screw according to the invention, the assembly process of the clamping disk is significantly simplified.

In addition, in the case of fasteners known from the prior art, the screws and the clamping disks are coated individually, wherein a further coating is usually carried out after assembly. By contrast, with the modular screw according to the invention, because the clamping disk is connected to the screw via the connecting means, it is sufficient to have a single coating process.

A screw according to the invention, wherein the technical features of the embodiments described above can be combined as desired with one another, thus has the maximum possible modularity with respect to the technical requirements for the screw, in that corresponding functional portions are provided and the corresponding technical features can be combined with one another depending on the requirements.

The modular screw can be provided, for example, for attaching the following components: Trim parts of motor vehicles, e.g., bumpers or underbody panels, engine covers, door sill covers or wheel boxes, panel parts, e.g., doors, interior or trunk flap, attachment of antennas, airflow channels, radiator grill, plastic panels in general, and also attachment of power buses (copper material), valve hoods, oil pans, and similar applications in the field of powertrains.

Furthermore, according to the present invention, a method for producing a modular screw, in particular one of the modular screws described above, is provided.

According to a further aspect of the present invention, a modular screw according to the invention can be produced by
- pressing the screw head and the shank in a pressing machine,
- applying the washer and/or clamping disk to the shank, preferably in a rolling machine, and
- rolling the external thread in the rolling machine.

If necessary, a further step of heat-treating and/or coating of the modular screw can occur.

In this way, a modular screw according to the invention can be produced, in which two components do not have to be coupled or connected to one another in order to be produced. This is done in a single intermediate step during the rolling process. In addition, the clamping disk and/or washer and screw need not be separately coated and/or heat-treated; rather, this occurs in a single production step.

The further advantages of a method according to the invention for producing a modular screw have already been set forth above with reference to the various aspects of the present invention.

The technical features of the various aspects of the present invention can be combined as desired, to the extent technically possible. This also defines the modularity and flexibility of the modular screw.

BRIEF DESCRIPTION OF THE DRAWINGS

The present invention will be described in more detail in the following on the basis of multiple exemplary embodiments shown in the figures. The figures show.

DETAILED DESCRIPTION

A modular screw 1 according to the invention is described in the following on the basis of a first exemplary embodiment (FIGS. 1 to 12).

The modular screw 1 has, along a longitudinal axis 3 extending in the axial direction 2, a screw head 4, a first functional portion 5, a second functional portion 6, a third functional portion 7, and a fourth functional portion 8.

Any desired drive 9 is formed on the screw head 4. An internal or external hexagon, a slotted or Phillips connection, or a Torx can be provided as the drive 9.

Figure 4:
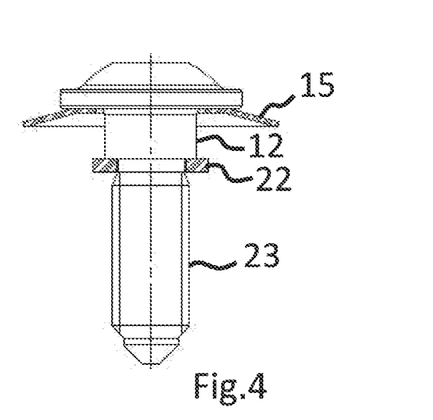
FIG. 4 is a partially free-cut side view of the modular screw.
Figure 5:
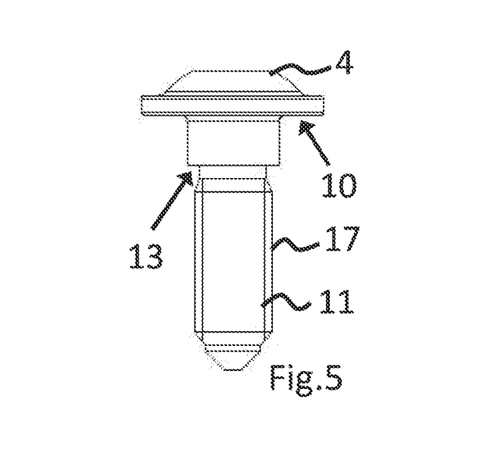
FIG. 5 is a side view of a screw head and a shank of the modular screw.
Figure 6:
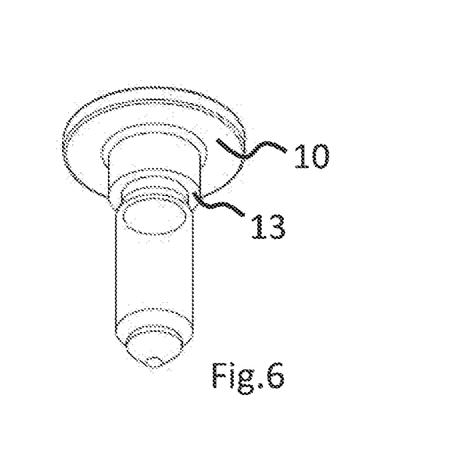
FIG. 6 is a perspective view of the screw head and the shank of the modular screw.

On a side opposite to the drive 9, the screw head 4 has a stop surface 10 which extends transversely to the axial direction.

Adjacent to the stop surface 10, a clamping disk, preferably a disk spring, is arranged in the first functional portion 5 in order to generate a prestressing. The disk spring is connected in the axial direction to an axially extending screw shank 11 in a positionally fixed manner.

Figure 7:
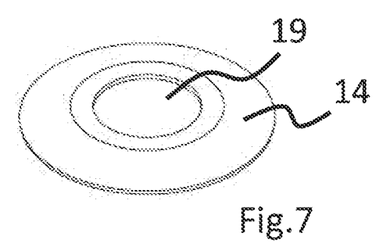
FIG. 7 is a perspective view of a clamping disk of the modular screw.
Figure 8:
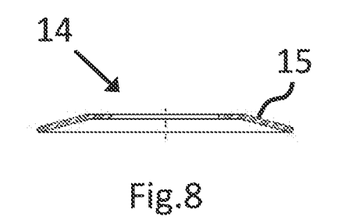
FIG. 8 is a laterally cut view of the clamping disk.
Figure 9:
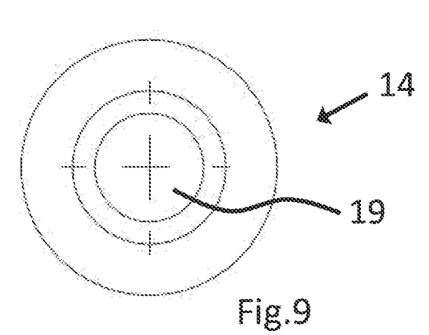
FIG. 9 is a plan view of the clamping disk.

The clamping disk 14 preferably takes the form of a disk spring and has a through-opening 19.

Figure 1:
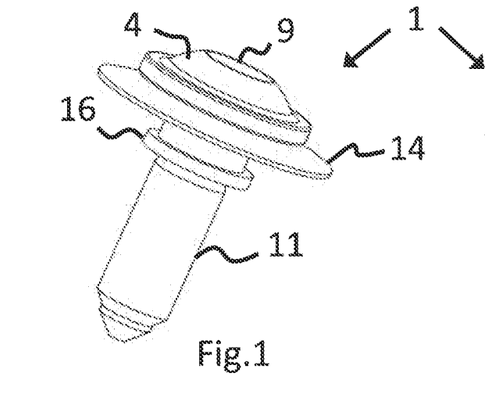
FIG. 1 is a perspective view of a modular screw according to a first exemplary embodiment.
Figure 2:
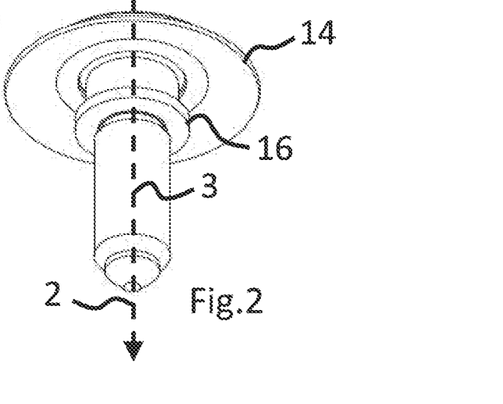
FIG. 2 is a further perspective view of the modular screw.
Figure 3:
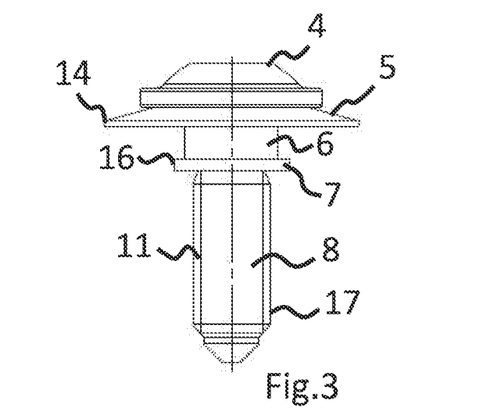
FIG. 3 is a side view of the modular screw.

The first functional portion 5 having the clamping disk 14 forms a prestressing portion 15.

Adjacent to the first functional portion, in axial direction 2, the second functional portion 6 is provided in the form of a compression-limiting portion 12. The compression-limiting portion 12 is approximately cylindrical in form. However, it can also be formed to extend in a tapered manner or taper in a conical manner in axial direction 2.

Adjacent to the third functional portion 7, the compression-limiting portion 12 has a stop surface 13 extending transversely to the axial direction.

A height of the compression-limiting portion 12 in axial direction 2 is less than a height of a through-opening of a component in which the first and the second functional portions 5, 6, 12, 15 are arrangeable.

In the third functional portion 7, a washer 16 is rotatably connected to or mounted on the screw shank 11 about the longitudinal axis 3 and secured thereto in a positionally fixed manner in the axial direction 2.

The positionally fixed securing in the axial direction of the washer 16 is achieved in that the washer is secured approximately in a positionally fixed manner in the axial direction 2 by bearing against the stop surface 13 of the second and an edge of the fourth functional portion.

Figure 10:
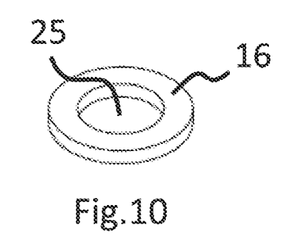
FIG. 10 is a perspective view of a washer of the modular screw.
Figure 11:
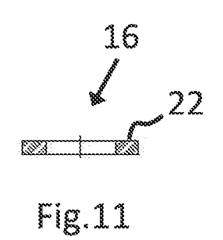
FIG. 11 is a laterally cut view of the washer.
Figure 12:
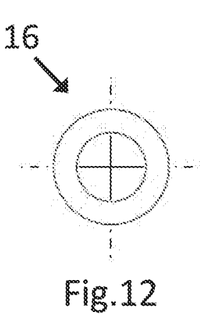
FIG. 12 is a plan view of the washer.

The washer 16 has a through-opening 25.

The third functional portion 7 having the washer 16 forms a force-distributing portion 22.

In the fourth functional portion 8, an external thread 17 is formed on an external sheath wall of the screw shank 11.

The fourth functional portion 8 having the external thread 17 forms a threaded portion 23.

A method for producing a modular screw
comprises the following steps:
pressing a screw head and a shank in a pressing machine,
applying a clamping disk and/or a washer in a feeding device of a rolling machine, and
rolling the external thread in the rolling machine, and if necessary, heat-treating and/or coating the modular screw.

In the present invention, on the other hand, a blank of the screw, comprising the screw head and the shank, is initially produced by means of pressing in the pressing machine. Subsequently, unhardened and uncoated disks and blanks are fed to the rolling machine. The feeding can be carried out via corresponding feeding devices, e.g., a distributor pot or a feeding bar or the like.

In the rolling machine, the clamping disk and/or washer are then applied to the shank in a region prior to corresponding roller jaws for thread rolling. Thereafter, the external thread is rolled or produced by means of the roller jaws in the rolling machine.

The screw and washer(s) can then be jointly hardened and coated in order to form the modular screw.

Accordingly, a corresponding device for producing a modular screw comprising the pressing and rolling machine described above can also be provided according to the present invention.

A modular screw 1 according to the invention according to a second exemplary embodiment is described in further detail below (FIGS. 13 to 16). Unless described otherwise, the modular screw 1 according to the second exemplary embodiment has the same technical features as the modular screw 1 according to the first exemplary embodiment.

Figure 13:
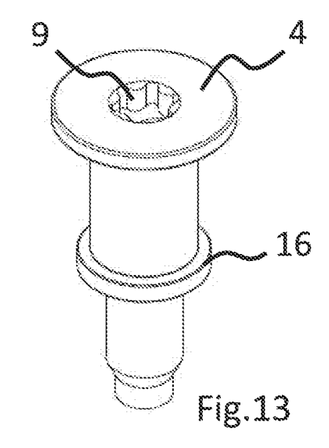
FIG. 13 is a perspective view of a modular screw according to a second exemplary embodiment.
Figure 14:
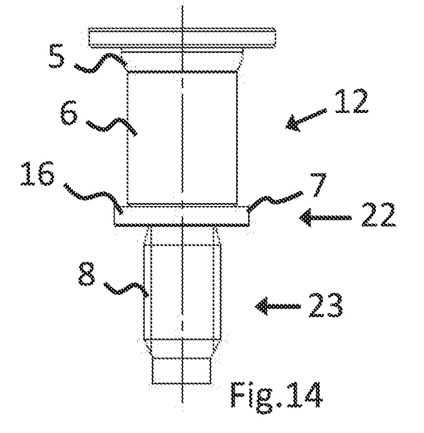
FIG. 14 is a side view of the modular screw.

By contrast to the first exemplary embodiment, a clamping disk 14 is not provided in the modular screw 1 according to the second exemplary embodiment.

Accordingly, the modular screw 1 according to the second exemplary embodiment has, in the axial direction 2, the screw head 4, the first and the second functional portions 5, 6, which are designed as a single functional portion in the present exemplary embodiment, the third functional portion 7, and the fourth functional portion 8.

Figure 15:
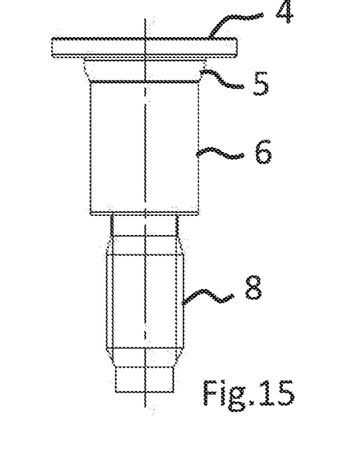
FIG. 15 is a side view of a screw head and a shank of the modular screw.

The first and the second functional portions 5 are designed as compression-limiting portions 12.

Figure 16:
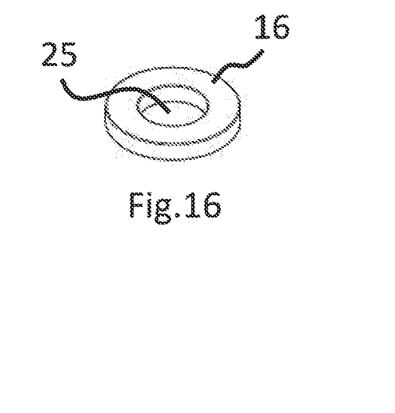
FIG. 16 is a perspective view of a washer.

The washer 16 is arranged and rotatably connected to the screw shank about the longitudinal axis in the third functional portion 7, which takes the form of a force-distributing portion. According to the first exemplary embodiment, the screw is arranged in a positionally fixed manner in the axial direction by bearing against the fourth and against the first and the second functional portions.

The production thereof occurs analogously to the first exemplary embodiment, but preferably without a clamping disk 16.

In the following, a modular screw 1 according to the invention according to a third exemplary embodiment is explained (FIGS. 17 to 25). Unless described otherwise, the modular screw 1 according to the third exemplary embodiment has the same technical features as the modular screw 1 according to the first and the second exemplary embodiment.

Figure 17:
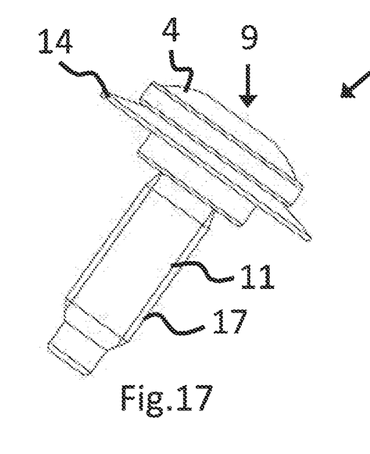
FIG. 17 is a perspective view of a modular screw according to a third exemplary embodiment.
Figure 24:
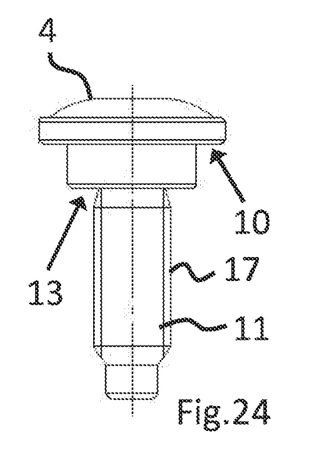
FIG. 24 is a screw head and a shank of the screw.
Figure 25:
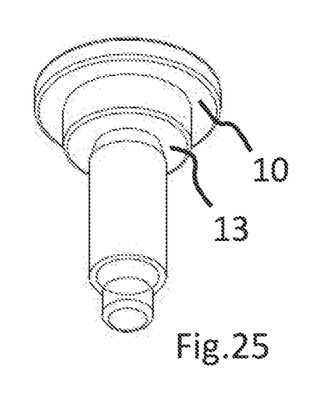
FIG. 25 is a perspective view of the screw head and the modular screw.

The modular screw according to the third exemplary embodiment comprises, in axial direction 2, the screw head 4 and a corresponding screw shank 11.

Figure 18:
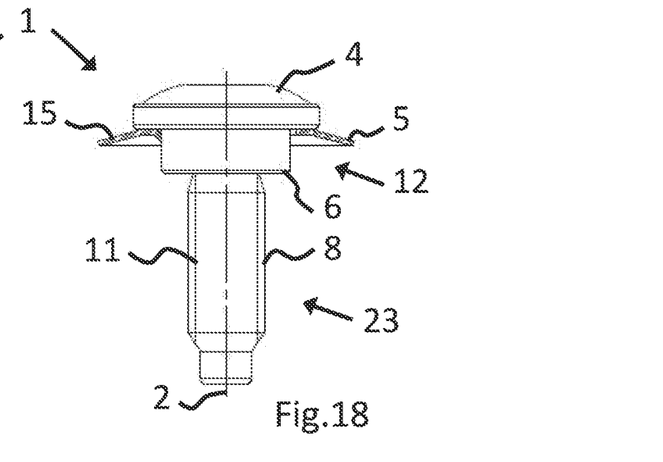
FIG. 18 is a partially cut side view of the modular screw.
Figure 19:
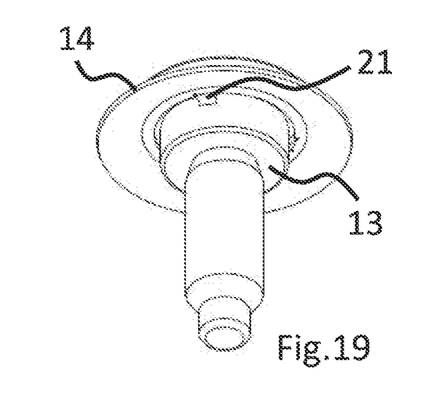
FIG. 19 is a further perspective view of the modular screw.

The screw 1 further has, in axial direction 2, the first functional portion 5, the second functional portion 6, and the fourth functional portion 8.

According to the first exemplary embodiment, a clamping disk 16 is arranged in the first functional portion 5, which takes the form of a prestressing portion 15.

The screw 1 and the clamping disk 16 can be provided according to the first exemplary embodiment.

Figure 20:
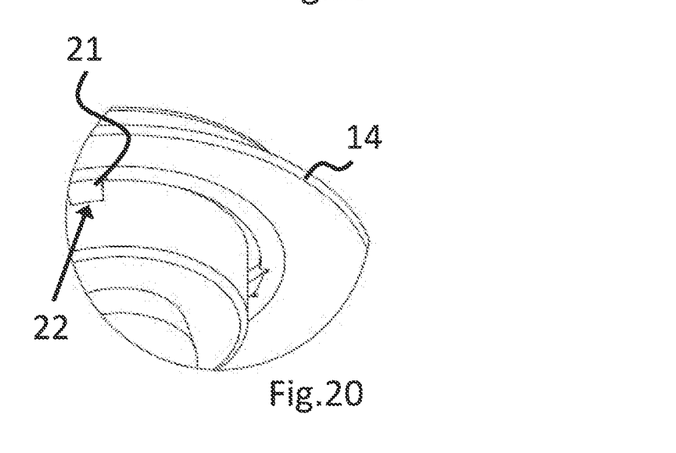
FIG. 20 is a detail view of the modular screw in FIG. 19.
Figure 21:
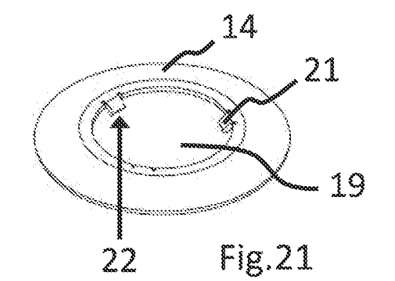
FIG. 21 is a perspective view of a clamping disk with connecting means.

Alternatively, according to the third exemplary embodiment, it is provided that the clamping disk 16 has connecting means 21, via which the clamping disk is connected to the shank 11 in a positionally fixed manner connected by means of frictional and/or form-fitting engagement.

Figure 22:
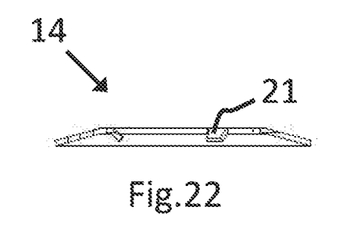
FIG. 22 is a laterally cut view of the clamping disk.
Figure 23:
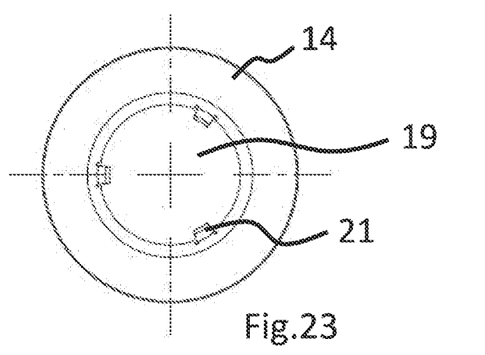
FIG. 23 is a plan view of the clamping disk.

The clamping disk takes the form of a disk spring and has a through-opening 19. In the through-opening 19, three connecting means 21, which extend inwardly in the radial direction 20 in the direction of the longitudinal axis 3, are arranged radially circumferentially and equally spaced apart.

The connecting means take the form of tabs 21 having contact edges 22 running along a circular direction. The contact edges 22 of the connecting means 21 connect the clamping disk 14 to the screw shank in the region of the first functional portion by means of a frictional engagement.

According to this exemplary embodiment, the clamping disk 16 can be connected to the screw shank 11 by pressing.

LIST OF REFERENCE NUMERALS

1 Screw
2 Axial direction
3 Longitudinal axis
4 Screw head
5 First functional portion
6 Second functional portion
7 Third functional portion
8 Fourth functional portion
9 Drive
10 Stop surface
11 Screw shank
12 Compression-limiting portion
13 Stop surface
14 Clamping disk
15 Prestressing portion
16 Washer
17 External thread
18
19 Through-opening
20 Radial direction
21 Connecting means
22 Contact edge
23 Power transfer portion
24 Threaded portion
25 Through-opening

The invention claimed is:
1. A modular screw, wherein the screw has, in an axial direction, the following elements:
a screw head,
a shank having
a first functional portion,
a second functional portion,
a third functional portion, for distributing a prestressing force, wherein a washer is arranged in the third functional portion and is mounted so as to be rotatable about a longitudinal axis of the screw, and
a fourth functional portion having an external thread, and
wherein the washer is secured in an approximately positionally fixed manner in the axial direction by bearing against the second functional portion and the fourth functional portion;
wherein the first functional portion is between the screw head and the second functional portion, wherein a clamping disk is arranged in the first functional portion to form a prestressing portion.

2. The modular screw as claimed in claim 1,
wherein the clamping disk takes the form of a disk spring and is connected and secured to the shank in a positionally fixed manner.

3. The modular screw as claimed in claim 1, wherein
the second functional portion is a compression-limiting portion whose diameter is larger than a diameter of the external thread.

4. The modular screw as claimed in claim 1, wherein
the washer has a larger diameter than the second functional portion.

5. The modular screw as claimed in claim 1,
wherein the modular screw is installed in a through-opening of a component,
wherein a length of the second functional portion and of the third functional portion in the axial direction is less than a height of the through-opening of the component in the axial direction.

6. The modular screw as claimed in claim 1,
produced by
pressing the screw head and the shank in a pressing machine, applying the washer and/or clamping disk to the shank, in a rolling machine, and
rolling the external thread in the rolling machine.

7. A modular screw, wherein the screw has, in an axial direction, the following elements:
a screw head,
a shank having
a first functional portion, for applying a prestressing force, wherein a clamping disk is arranged in the first functional portion adjacent to the screw head, wherein the clamping disk takes the form of a disk spring and is connected and secured to the shank in a positionally fixed manner,
a second functional portion,
a third functional portion, wherein a washer is arranged in the third functional portion and is mounted so as to be rotatable about a longitudinal axis of the screw,
and a fourth functional portion having an external thread,
wherein the washer is secured in a positionally fixed manner, in the axial direction, between the third functional portion and the external thread of the fourth functional portion by bearing against the second functional portion and the external thread of the fourth functional portion.

8. The modular screw as claimed in claim 7,
wherein
the clamping disk has a connecting means via which the clamping disk is connected to the shank in a positionally fixed manner by means of frictional and/or form-fitting engagement, wherein the connecting means is designed to provide a frictional connection.

9. The modular screw as claimed in claim 8,
wherein
the clamping disk has a through-opening, wherein the connecting means takes the form of tabs having retaining edges, said tabs being directed from an edge of the through-opening in the radial direction inwardly in the direction of the longitudinal axis.

10. A method for producing the screw as claimed in claim 7, comprising the following steps:
pressing the screw head and the shank in a pressing machine,
applying the clamping disk and/or the washer in a feeding device of a rolling machine, and
rolling the external thread in the rolling machine, and
heat-treating and/or coating the modular screw.

* * * * *